United States Patent
Qiao et al.

(10) Patent No.: US 7,491,757 B2
(45) Date of Patent: *Feb. 17, 2009

(54) FULLY CURED THERMOPLASTIC ELASTOMER, PROCESS FOR ITS MANUFACTURE AND APPLICATIONS THEREOF

(75) Inventors: Jinliang Qiao, Beijing (CN); Yiqun Liu, Beijing (CN); Xiaohong Zhang, Beijing (CN); Jianming Gao, Beijing (CN); Genshuan Wei, Beijing (CN); Shijun Zhang, Beijing (CN); Zhihai Song, Beijing (CN); Jiuqiang Li, Beijing (CN); Dechuan Zhuang, Beijing (CN)

(73) Assignees: China Petroleum & Chemical Corporation, Beijing (CN); Beijing Research Institute of Chemical Industry China Petroleum & Chemical Corporation, Beijing (CN)

( * ) Notice: Subject to any disclaimer, the term of this patent is extended or adjusted under 35 U.S.C. 154(b) by 200 days.

This patent is subject to a terminal disclaimer.

(21) Appl. No.: 10/049,233

(22) PCT Filed: Jun. 15, 2001

(86) PCT No.: PCT/CN01/00972

§ 371 (c)(1),
(2), (4) Date: Jul. 25, 2002

(87) PCT Pub. No.: WO02/33003

PCT Pub. Date: Apr. 25, 2002

(65) Prior Publication Data

US 2003/0045638 A1    Mar. 6, 2003

(30) Foreign Application Priority Data

Jun. 15, 2000    (CN) ............... 00 1 09220

(51) Int. Cl.
C08K 5/00    (2006.01)
C08L 7/00    (2006.01)
C08L 13/00   (2006.01)
C08L 19/00   (2006.01)
C08L 15/00   (2006.01)

(52) U.S. Cl. .................. 524/81; 525/55
(58) Field of Classification Search .......... 525/55; 524/81

See application file for complete search history.

(56) References Cited

U.S. PATENT DOCUMENTS

| | | | |
|---|---|---|---|
| 4,818,785 A * | 4/1989 | Otawa et al. | 524/576 |
| 5,082,732 A | 1/1992 | Ueda et al. | |
| 5,298,211 A | 3/1994 | Hamanaka et al. | 264/211.24 |
| 5,889,119 A * | 3/1999 | Coran et al. | 525/232 |
| 6,096,830 A | 8/2000 | Takemura et al. | 525/192 |
| 6,179,008 B1 * | 1/2001 | Kawazura et al. | 138/125 |
| 6,384,145 B1 * | 5/2002 | Mertzel et al. | 525/232 |
| 6,423,760 B1 * | 7/2002 | Qiao et al. | 522/150 |
| 6,838,490 B2 * | 1/2005 | Zhang et al. | 522/148 |
| 6,998,438 B2 * | 2/2006 | Qiao et al. | 525/64 |
| 2004/0039075 A1 * | 2/2004 | Sahnoune et al. | 521/142 |
| 2004/0147677 A1 * | 7/2004 | Angus et al. | 525/194 |

FOREIGN PATENT DOCUMENTS

| | | |
|---|---|---|
| EP | 0 215 959 | 4/1987 |
| EP | 1 262 510 | 12/2002 |
| JP | 8113679 | 5/1996 |
| JP | 10314341 | 12/1998 |
| JP | 1178282 | 3/1999 |

OTHER PUBLICATIONS

U.S. Appl. No. 10/049,333: copending application of Zhang et al.*
Definition of "spheroid", Merriam-Webster's Collegiate Dictionary Tenth Edition, p. 1131.*
English Abstract of JP 8113679 Publication Dated May 7, 1996.
English Abstract of JP 11078282 Publication Dated Mar. 23, 1999.
English Abstract of JP 10314341 Publication Dated Dec. 2, 1998.
Thermoplastic Elastomers 2nd Edition, Edited by: Geoffrey Holden, Norman R. Legge, Roderic P. Quirk, Herman E. Schroeder, pp. 156-161, date unknown.
Polymer Blends, vol. 3: Performance, Thermoplastic Vulcanizates, Sabet Abdou-Sabet, Sudhin Datta, pp. 517, 519-521, 2000.

* cited by examiner

*Primary Examiner*—Michael J Feely
(74) *Attorney, Agent, or Firm*—Ladas and Parry LLP

(57) ABSTRACT

The present invention provides a fully vulcanized thermoplastic elastomer comprising a rubber phase with a controllable particle size and a spheroidic shape, the preparation and use thereof. Fully vulcanized powdery rubber is blended with plastic by conventional method for blending rubbers, and thus obtaining a fully vulcanized thermoplastic elastomer, which comprises a rubber phase with a controllable particle size and a spheroidic shape, and which shows high tensile strength and high elongation at break, good appearance and good processibility.

17 Claims, 1 Drawing Sheet

Figure 1:

FULLY CURED THERMOPLASTIC ELASTOMER, PROCESS FOR ITS MANUFACTURE AND APPLICATIONS THEREOF

The present invention relates to a thermoplastic elastomer, more particularly, to a fully vulcanized thermoplastic elastomer obtained by blending method, a process for preparation and use thereof.

Fully vulcanized thermoplastic elastomer, which is prepared by the process of mechanically blending elastomer with rigid plastics under certain conditions, is one kind of new materials that have been developed since 1980s. Such thermoplastic elastomer has the features of both plastics and rubbers, namely, showing high elasticity of rubbers under normal temperature, while being capable of plasticize at elevated temperature. In morphology of the fully vulcanized thermoplastic elastomer, the fully crosslinked rubber phase was dispersed into the plastic matrix. Strength, elasticity, thermal resistance and compression set resistance of the fully vulcanized thermoplastic elastomer are substantially improved compared with the un-crosslinked thermoplastic elastomer, due to the crosslinking of rubber phase. Furthermore, the chemical resistance and processing stability are greatly improved, and the properties of the materials are widely adjustable due to the wider range of rubber/plastic blending ratio.

The fully vulcanized thermoplastic elastomers obtained by dynamic vulcanization method are known in the art, for example, are described in the literatures: "Development of fully vulcanized EPDM/PP thermoplastic elastomer", *China Synthetic Rubber Industry*, No. 5, P361-364 (1986); "Development of fully cured thermoplastic elastomer of polyolefin", *Chemical Industry and Engineering Progress*, No. 5, P16-19 (1987); *Mechanical modification of elastomer*, editor Zu Yujun, Beijing Science and Technology Press, P335-395 (1992). The term "dynamic vulcanization" used herein refers to a process of vulcanization by means of cross-linking agent and intense shear stress when blending rubbers and plastics, the cruxes of which are that the mixing should not be stopped until the vulcanization is finished and there should be sufficient amount of curing agent to ensure the full vulcanization of rubber phase.

Since the full vulcanization of rubber phase in the conventional dynamic vulcanization method was carried out during blending, the requirements of cross-linking agent, blending temperature, shear rate, blending time and collaboration therebetween is rather high; additionally, special blending equipment is required, which leads to high production cost, complex procedure, and incontrollable average particle size of rubber phase and crosslinking degree. Difficulties exist in the production of fully vulcanized thermoplastic elastomer of saturated rubber type (e.g. acrylic rubber and silicon rubber), and the requirement in equipment is high. In respect of fully vulcanized thermoplastic elastomer, its physical properties are greatly influenced by the particle size of the rubber phase, the smaller particle size of the rubber phase, the higher tensile strength and breaking elongation of the material, and the better processability of the material. The particle size of the rubber phase of the fully vulcanized thermoplastic elastomer obtained by dynamic vulcanization is mainly dependent upon the balance between the shear rate and the speed of chemical cross-linking reaction, and thus is difficult to be very small. As described by Coran A. Y. et al, *Rubb. Chem. Technol.* 53(1), 141(1980), the average particle size of rubber phase of fully vulcanized thermoplastic elastomer obtained by dynamic vulcanization is 1μ-2μ. In addition, large amounts of rubber is dispersed into plastic matrix because the phase inversion of rubber contained in the conventional fully vulcanized thermoplastic elastomer is carried out during the melt shearing and curing steps of the dynamic vulcanization method. Therefore, the shape of the rubber phase is irregular, which is adverse to rheological property and processability of the fully vulcanized thermoplastic elastomer. Moreover, the articles produced with the fully vulcanized thermoplastic elastomer in prior art have a dark color, that is, it is difficult to obtain an article with light color, because curing agent has to be used in the dynamic vulcanization method.

One object of the present invention is to provide a fully vulcanized thermoplastic elastomer, wherein the rubber phase has a particle size of 0.02μ-1μ.

Another object of the present invention is to provide a fully vulcanized thermoplastic elastomer, wherein the rubber phase has a spheroidic shape.

Another object of the present invention is to provide a fully vulcanized thermoplastic elastomer, wherein the rubber phase has a controllable particle size and a spheroidic shape.

Yet another object of the present invention is to provide a process for preparing said fully vulcanized thermoplastic elastomer. Said process uses general rubber/plastic blending equipment, and is a simple procedure and could well control particle size and particle size distribution of the rubber phase as well as cross-linking degree.

Still another object of the present invention is to provide the use of said thermoplastic elastomer for producing various moulded articles.

According to one aspect of the present invention, the average particle size of the dispersed phase, i.e. rubber phase, of the fully vulcanized thermoplastic elastomer is typically 0.02μ-1μ, preferably 0.05μ-0.5μ, more preferably 0.05μ-0.2μ.

According to another aspect of the present invention, the shape of the rubber phase of the fully vulcanized thermoplastic elastomer is regularly spheroidic. In one preferable embodiment of this aspect of the present invention, the particle size of the rubber phase is 0.02μ-1μ, preferably 0.05μ-0.5μ, more preferably 0.05μ-0.2μ.

In the present fully vulcanized thermoplastic elastomer, the weight ratio of rubber phase to plastic matrix is preferably 30:70~75:25, more preferably 50:50~75:25. The rubber phase of said fully vulcanized thermoplastic elastomer has a gel content of at least 60% by weight, preferably at least 75% by weight.

In the present invention, there is no restriction in the rubber kind of the rubber phase of the fully vulcanized thermoplastic elastomer, and which can be selected from, for example, the group consisting of fully vulcanized natural rubber, styrene-butadiene rubber, carboxylated styrene-butadiene rubber, nitrile rubber, carboxylated nitrile rubber, chloroprene rubber, polybutadiene rubber, acrylic rubber, butadiene-styrene-vinylpyridine rubber, isoprene rubber, butyl rubber, ethylene-propylene rubber, polysulfide rubber, acrylic-butadiene rubber, silicone rubber, polyurethane rubber, and fluorine rubber.

The plastic matrix of said fully vulcanized thermoplastic elastomer comprises at least one polymer or copolymer thereof selected from the group consisting of polyamide, polypropylene, polyethylene, polyvinyl chloride, polyurethane, polyester, polycarbonate, polyoxymethylene, polystyrene, polyphenylene oxide, polyphenylene sulfide, polyimide, polysulfone and the like.

The process used for preparing the fully vulcanized thermoplastic elastomer of the present invention comprises blending the fully vulcanized powdery rubber and the plastic and then pelleting the obtained mixture to form the fully vulcanized thermoplastic elastomer in a rubber/plastic blending equipment by common rubber/plastic blending method. The average particle size of the fully vulcanized powdery rubber used therein is dependent on the particle size of the rubber phase present in the fully vulcanized thermoplastic elastomer, which is typically 0.02μ-1μ, preferably 0.05μ-0.5μ, more preferably 0.05μ-2μ. The weight ratio of the fully vulcanized powdery rubbery to the plastic is preferably 30:70 to 75:25, more preferably 50.50 to 75:25. For blending, the powdery rubber and the plastic can be mixed atone time; alternatively, a part of powdery rubber and plastic are first mixed to forma blend, which is then mixed with the rest powdery rubber In preparing the present fully vulcanized thermoplastic elastomer, the plastic matrix can be at least one polymer or copolymer thereof selected from the group consisting of polyamide, polypropylene, polyethylene, polyvinyl chloride, polyurethane, polyester, polycarbonate, polyoxymethylene, polystyrene, polyphenylene oxide, polyphenylene sulfide, polyimide, polysulfone and the like.

The suitable fully vulcanized powdery rubber used in the present invention can be the powdery rubber prepared by the process disclosed in Chinese Patent Application No. 99125530.5 (Dec. 3, 1999) by the present inventor, which is incorporated herein by reference. Said powdery rubber comprises at least one fully vulcanized powdery rubber selected from the group consisting of fully vulcanized powdery natural rubber, fully vulcanized powdery styrene-butadiene rubber, fully vulcanized powdery carboxylated styrene-butadiene rubber, fully vulcanized powdery nitrile rubber, fully vulcanized powdery carboxylated nitrile rubber, fully vulcanized powdery polybutadiene rubber, fully vulcanized powdery chloroprene rubber, fully vulcanized powdery silicone rubber, fully vulcanized powdery acrylic rubber, fully vulcanized powdery styrene-butadiene-vinylpyridine rubber, fully vulcanized powdery isoprene rubber, fully vulcanized powdery butyl rubber, fully vulcanized powdery ethylene-propylene rubber, fully vulcanized powdery polysulfide rubber, fully vulcanized powdery acrylic-butadiene rubber, fully vulcanized powdery polyurethane rubber, and fully vulcanized powdery fluorine rubber and the like. Said fully vulcanized powdery rubber has a gel content of at least 60% by weight, more preferably at least 75% by weight.

The present fully vulcanized powdery rubber can be obtained by vulcanizing the corresponding rubber latex with irradiation. For example, the present fully vulcanized powdery rubber can be prepared by irradiating a feed rubber latex which is commercial available or prepared by user, in the presence or absence of a crosslinking agent, with a high-energy irradiation, to vulcanize it fully. The irradiation of high-energy rays can be selected from cobalt source, X-rays, UV rays, and high-energy electron beams, preferably cobalt source. The irradiation dose is dependent on the kinds and compositions of the latex. In general, the irradiation dose is selected such that the fully vulcanized rubber obtained by irradiating and thus vulcanizing said rubber latex has a gel content of 60% by weight or higher, preferably 75% by weight or higher, more preferably 90% by weight or higher. The irradiation dose can be 0.1 to 30 Mrad (megarads), preferably 0.5 to 20 Mrad. If desired, the irradiated latex can be dried to obtain a fully vulcanized powdery rubber having a particle size that is substantially the same as the size of the rubber particles in the latex. The drying process can be carried out by a spray dryer or by precipitation drying method. If the drying is carried out by a spray dryer, the inlet temperature can be controlled at 100 to 200° C., and the outlet temperature at 20 to 80° C.

In the present invention, there is no restriction in the rubber latex used as starting material, and which can be selected from the group consisting of natural rubber latex, styrene-butadiene rubber latex, carboxylated styrene-butadiene rubber latex, nitrile rubber latex, carboxylated nitrile rubber latex, chloroprene rubber latex, polybutadiene rubber latex, acrylic rubber latex, butadiene-styrene-vinylpyridine rubber latex, isoprene rubber latex, butyl rubber latex, ethylene-propylene rubber latex, polysulfide rubber latex, acrylic-butadiene rubber latex, silicone rubber latex, polyurethane rubber latex, and fluorine rubber latex. The size of the rubber particles can be varied depending on various end uses.

A cross-linking agent is optionally used in the preparation of the present fully vulcanized powdery rubber. The suitable cross-linking agent can be mono-, di-, tri-, tetra- or multi-functional cross-linking agent, and any combination thereof. Examples of the monofunctional cross-linking agent include, but no limited to, octyl (meth)acrylate, isooctyl (meth)acrylate, glycidyl (meth)acrylate; examples of the difunctional cross-linking agent include, but not limited to, 1,4-butandiol di(meth)acrylate, 1,6-hexandiol di(meth)acrylate, diethylene glycol di(meth)acrylate, triethylene glycol di(meth)acrylate, neopentyl glycol di(meth)acrylate, divinyl benzene; examples of the trifunctional cross-linking agent include, but not limited to, trimethylolpropane tri(meth)acrylate, pentaerythritol tri(meth)acrylate; examples of the tetrafunctional cross-linking agent include, but not limited to, pentaerythritol tetra(meth)acrylate, ethoxylated pentaerythritol tetra(meth)acrylate; examples of the multifunctional cross-linking agent include, but not limited to, di-pentaerythritol penta(meth)acrylate. In the context of the present invention, the term "(meth)acrylate" means acrylate and methacrylate.

The above-mentioned cross-linking agent can be used alone or in any combination thereof, as long as it facilitates the irradiation vulcanization.

The amount of the cross-linking agent added varies depending upon the kinds and compositions of rubber latex, and generally is 0.1 to 10% by weight, preferably 0.5 to 9% by weight, more preferably 0.7 to 7% by weight, based on the neat weight of the rubber.

During preparation, blending temperature of the materials is that suitable for common plastic processing, which is determined by the melting temperature of the plastic matrix and should be selected within such a range where the plastic matrix is melt completely without decomposition. In addition, conventional processing aids and compatibilizer for plastic processing can be suitably added to the blended materials, if desired.

The blending equipment used in the present invention istwo roll mill, Banbury mixer, single-screw extruder or twin-screw extruder and the like.

Compared with the particle size of the rubber phase of the fully vulcanized thermoplastic elastomer obtained by conventional dynamic vulcanization, the particle size of the rubber phase of the present fully vulcanized thermoplastic elastomer is controllable, resulting in improved tensile strength and the breaking elongation, good appearance and good processibility. Moreover, the rubber phase of the present fully vulcanized thermoplastic elastomer has a regularly spheroidic shape, which is beneficial to rheological and processing performance. Additionally, it is not necessary to add curing agent when preparing the present vulcanized thermoplastic elastomer, thus easier to obtain a light-color article of the fully vulcanized thermoplastic elastomer. The fully vulcanized thermoplastic elastomer of the present invention is also easily fabricated into articles with varied colors. The processes of the present invention are simple, of low equipment cost and controllable in operation, which meet the requirements for large-scale commercial production, due to the utilizing of the conventional rubber/plastic blending equipment and common mixing method.

The fully vulcanized thermoplastic elastomer of the present invention has excellent properties and is used in manufacturing various moulded articles, such as hoses, corrugated tubes, gaskets, joints, electrical appliances, automotive fittings, building materials and sport equipment. After modifying said fully vulcanized thermoplastic elastomer to improve its flame resistance, the obtained flame-retarding article has a wider scope of application.

In the following examples, the particle size of the rubber phase of the fully vulcanized thermoplastic elastomer is measured by conventional transmission electron microscope (TEM) method.

The following specific examples will provide further illustrations of the present invention. These examples are not intended, however, to limit or restrict the scope of the invention as defined in the claims.

FIG. 1 is the TEM micrograph of the sample obtained in Example 2.

EXAMPLES 1

Fully vulcanized powdery styrene-butadiene rubber with an average particle size of about 0.1μ (which is prepared as follows: adding 3% of cross-linking agent trimethylolpropane triacrylate, based on the mass of dried styrene-butadiene rubber latex, to styrene-butadiene rubber latex Dingben-50 (available from Latex Research Center of Lanzhou Petrochemical Co., Ltd, GanSu, China), vulcanizing the formulation with the irradiation dose of 2.5 Mrad, then drying it via spray drying method) and polypropylene (designation: 1300, available from Yanshan Petrochemical Co., Ltd, Beijing, China) are blended at a ratio of 70/30 by weight, then 0.5% of antioxidant Irganox 1010 (manufactured by Ciba-Geigy, Switzerland) was added, based on the total weight of powdery styrene-butadiene rubber and polypropylene. The obtained formulation is pelletized in a ZSK-25 model twin-screw extruder (WP company, Germany). The temperature of the individual sections of the extruder is set at 170° C., 190° C., 190° C., 190° C., 190° C., 195° C. (die), respectively. The analysis of thus obtained pellets shows that the rubber phase of the thermoplastic elastomer has an average particle size of about 0.1μ, and is of a spheroidic shape.

The pellets are injection-moulded into standard specimen bar for testing. The properties of the fully vulcanized styrene-butadiene rubber/polypropylene thermoplastic elastomer tested are listed in Table 1. Whiteness of the thermoplastic elastomer is 35.57 (according to GB2913-88), which enables to dye the articles to any desired colors.

EXAMPLES 2

Fully vulcanized powdery styrene-butadiene rubber with an average particle size of about 0.1μ, as described in Example 1, and polystyrene (designation: 666D, available from Yanshan Petrochemical Co., Ltd, Beijing, China) are blended at a ratio of 70/30 by weight, then 0.5% of antioxidant Irganox 1010 was added, based on the total weight of powdery styrene-butadiene rubber and polystyrene. The obtained formulation is pelletized in a ZSK-25 model twin-screw extruder (WP Company, Germany). The temperature of the individual sections of the extruder is set at 170° C., 185° C., 185° C., 185° C., 185° C., 190° C. (die), respectively. The analysis of thus obtained pellets shows that the rubber phase of the thermoplastic elastomer has an average particle size of about 0.1μ, and is of a spheroidic shape.

The pellets are injection-moulded into standard specimen bar for testing. The properties of the fully vulcanized styrene-butadiene rubber/polystyrene thermoplastic elastomer tested are listed in Table 1.

EXAMPLE 3

The procedure in Example 2 is repeated except that polystyrene is replaced with high-impact polystyrene (HIPS) (designation: 492J, available from Yanshan Petrochemical Co., Ltd, Beijing, China). The analysis of the obtained pellets shows that the rubber phase of the thermoplastic elastomer has an average particle size of about 0.1μ, and is of a spheroidic shape. The properties of the fully vulcanized styrene-butadiene rubber/HIPS thermoplastic elastomer tested are listed in Table 1.

EXAMPLE 4

The procedure in Example 1 is repeated except that said polypropylene is replaced with polypropylene (designation: 1740, available from Yanshan Petrochemical Co., Ltd, Beijing, China). The analysis of the obtained pellets shows that the rubber phase of the thermoplastic elastomer has an average particle size of about 0.1μ, and is of a spheroidic shape. The properties of the fully vulcanized styrene-butadiene rubber/polypropylene thermoplastic elastomer tested are listed in Table 1.

EXAMPLE 5

Fully vulcanized powdery carboxylated styrene-butadiene rubber with an average particle size of about 0.1μ (which is prepared as follows: adding 3% of cross-linking agent isooctyl acrylate, based on the mass of dried carboxylated styrene-butadiene rubber latex, to carboxylated styrene-butadiene rubber latex XSBRL-54B1 (available from Yanshan Petrochemical Co., Ltd, Beijing, China), vulcanizing the formulation with the irradiation dose of 2.5 Mrad, then drying it via spray drying method) and Nylon-6 (1013B, manufactured by UBE Industries, Ltd., Japan) are blended at a ratio of 75/25 by weight, then 0.5% of antioxidant Irganox 1010 was added, based on the total weight of powdery carboxylated styrene-butadiene rubber and Nylon-6. The obtained formulation is pelletized in a ZSK-25 model twin-screw extruder (WP Company, Germany). The temperature of the individual sections of the extruder is set at 210° C., 225° C., 225° C., 225° C., 230° C., 225° C. (die), respectively. The analysis of thus obtained pellets shows that the rubber phase of the thermoplastic elastomer has an average particle size of about 0.15μ, and is of a spheroidic shape.

The pellets are respectively compression-moulded and injection-moulded into standard specimen bar for testing. The properties of the fully vulcanized carboxylated styrene-butadiene rubber/Nylon-6 thermoplastic elastomer tested are listed in Table 1.

EXAMPLE 6

The procedure in Example 5 is repeated except that the weight ratio of fully vulcanized powdery carboxylated styrene-butadiene rubber to Nylon-6 is changed to 50/50. The analysis of the obtained pellets shows that the rubber phase of the thermoplastic elastomer has an average particle size of about 0.15μ, and is of a spheroidal shape. The properties of the fully vulcanized powdery carboxylated styrene-butadiene rubber and Nylon-6 thermoplastic elastomer tested are listed in Table 1.

EXAMPLE 7

Fully vulcanized powdery carboxylated styrene-butadiene rubber as used in Example 5 and Nylon-6 are blended at a ratio of 70/30 by weight, and then pelletized in a Brabender single screw extruder. The temperature of the individual sections of the extruder is set at 160° C., 190° C., 230° C., 225° C., respectively. The analysis of thus obtained pellets shows that the rubber phase of the thermoplastic elastomer has an average particle size of about 0.15μ, and is of a spheroidic shape.

The pellets are injection-moulded into standard specimen bar for testing The properties of the fully vulcanized powdery carboxylated styrene-butadiene rubber/Nylon-6 thermoplastic elastomer tested are listed in Table 1.

EXAMPLE 8

Fully vulcanized powdery carboxylated styrene-butadiene rubber with an average particle size of about 0.15μ (which is prepared by the same procedure of Example 5 except that the irradiation dose is 10 Mrad) and Nylon-6 (1013B, available from UBE Industries, Ltd., Japan) are blended at a ratio of 40/30 by weight, then 0.7% of antioxidant Irganox 1010 was added, based on the total weight of powdery carboxylated styrene-butadiene rubber and Nylon-6. The obtained formulation is pelletized in a Brabender single screw extruder. The temperature of the individual sections of the extruder is set at 160° C., 190° C., 230° C., 225° C., respectively. Then the obtained pellets and the above-mentioned carboxylated styrene-butadiene powdery rubber are blended at a ratio of 70/30 by weight, and the final ratio of powdery carboxylated styrene-butadiene rubber to Nylon-6 is 70/30 by weight. Then, the final formulation is pelletized in a ZSK-25 model twin-screw extruder (WP Company, Germany). The temperature of the individual sections of the extruder is set at 210° C., 225° C., 225° C., 225° C., 230° C. and 225° C. (die), respectively. The analysis of thus obtained pellets shows that the rubber phase of the thermoplastic elastomer has an average particle size of about 0.15μ, and is of a spheroidic shape The finally obtained pellets are injection-moulded into standard specimen bar for testing. The properties of the fully vulcanized carboxylated styrene-butadiene rubber/Nylon-6 thermoplastic elastomer tested are listed in Table 1.

EXAMPLE 9

Fully vulcanized powdery carboxylated nitrile rubber with an average particle size of about 0.05μ (which is prepared as follows: adding 3% of cross-linking agent trimethylol propane triacrylate, based on the mass of dried carboxylated nitrile rubber latex, to carboxylated nitrile rubber latex XNBRL (available from Latex Research Center of Lanzhou Petrochemical Co., Ltd GanSu, China), vulcanizing the formulation with the irradiation dose of 10 Mrad, then drying it via spray drying method) and Nylon-6 (1013B, available from UBE Industries, Ltd., Japan) are blended at a ratio of 70/30 by weight, then 0.5% of antioxidant Irganox 1010 was added, based on the total weight of powdery carboxylated nitrile rubber and Nylon-6. The obtained formulation is pelletized in a ZSK-25 model twin-screw extruder (WP Company, Germany). The temperature of the individual sections of the extruder is set at 210° C., 225° C., 225° C., 225° C., 230° C. and 225° C. (die), respectively. The analysis of thus obtained pellets shows that the rubber phase of the thermoplastic elastomer has an average particle size of about 0.05μ, and is of a spheroidic shape.

The pellets are injection-moulded into standard specimen bar for testing. The properties of the fully vulcanized carboxylated nitrile rubber/Nylon-6 thermoplastic elastomer tested are listed in Table 1.

EXAMPLE 10

Fully vulcanized powdery natural rubber with an average particle size of about 0.5μ (which is prepared as follows: adding 5% of cross-linking agent trimethylolpropane triacrylate, based on the mass of dried natural rubber latex, to natural rubber latex (available from Beijing Latex Factory, China), vulcanizing the formulation with the irradiation dose of 15 Mrad, then drying it via spray drying method) and high density polyethylene (HDPE) resin (Designation: J-1, available from Beijing Second Auxiliaries Factory) are blended at a ratio of 70/30 by weight, then 0.5% of antioxidant Irganox 1010 was added, based on the total weight of powdery natural rubber and HDPE resin. The obtained formulation is blended in a Brabender kneader for 2 minutes, with the temperature of oil bath for the kneader set at 160° C. The analysis of thus obtained sample shows that the rubber phase of the thermoplastic elastomer has an average particle size of about 0.5μ, and is of a spheroidic shape.

The obtained sample is shaped into sheet by a two roll mill(temperature: 160° C.), and then tablettized to obtain the standard specimen for testing The properties of the fully vulcanized natural rubber/polyethylene thermoplastic elastomer tested are listed in Table 1.

TABLE 1

|  |  | Tensile strength (MPa) | Elongation at break (%) | Tension set (%) | Tensile strength at 100% elongation (MPa) | Shore Hardness |
| --- | --- | --- | --- | --- | --- | --- |
| Example 1 |  | 13.7 | 267 | 24 | 13.0 | 27(HD) |
| Example 2 |  | 10.1 | 90 | 25 | — | 33(HD) |
| Example 3 |  | 8.6 | 89 | 18 | — | 28(HD) |
| Example 4 |  | 8.7 | 273 | 17 | 8.1 | 21(HD) |
|  |  |  |  |  |  | 86(HA) |
| Example 5 | compressed specimen | 17.0 | 175 | 61 | 11.8 | 40(HD) |
|  | Injection moulded specimen | 16.4 | 216 | 101 | 10.5 | 40(HD) |

TABLE 1-continued

|  |  | Tensile strength (MPa) | Elongation at break (%) | Tension set (%) | Tensile strength at 100% elongation (MPa) | Shore Hardness |
|---|---|---|---|---|---|---|
| Example 6 | compressed specimen | 29.4 | 188 | 96 | 23.2 | — |
|  | Injection-moulded specimen | 27.6 | 200 | 129 | 22.5 | 56(HD) |
| Example 7 |  | 19.2 | 134 | 38 | — | 39(HD) |
| Example 8 |  | 19.8 | 167 | 70 | — | 46(HD) |
| Example 9 |  | 19.1 | 126 | 28 | — | 40(HD) |
| Example 10 |  | 15.0 | 438 | 122 | — | 86(HA) |
| Test standard |  | ASTM D412 | ASTM D412 | ASTM D412 | ASTM D 412 | ASTM D2240-95 |

What we claim is:

1. A fully vulcanized thermoplastic elastomer, comprising a rubber phase and a plastic matrix, wherein an average particle size of the rubber phase of said fully vulcanized thermoplastic elastomer is 0.02μ~1μ, wherein a shape of the rubber phase of said fully vulcanized thermoplastic elastomer is spheroidic, wherein the weight ratio of the rubber phase to the plastic matrix is 30:70 to 75:25, wherein the rubber phase of said fully vulcanized thermoplastic elastomer comprises at least one rubber selected from the group consisting of natural rubber, styrene-butadiene rubber, carboxylated styrene-butadiene rubber, nitrile rubber, carboxylated nitrile rubber, polybutadiene rubber, chloroprene rubber, silicone rubber, acrylic rubber, styrene-butadiene-vinylpyridine rubber, isoprene rubber, butyl rubber, polysulfide rubber, acrylic-butadiene rubber, polyurethane rubber, and fluorine rubbers, and wherein the rubber phase is provided by a fully vulcanized powdery rubber prepared by vulcanizing a corresponding rubber latex with irradiation.

2. The fully vulcanized thermoplastic elastomer according to claim 1, wherein said rubber phase has a gel content of at least 60% by weight.

3. The fully vulcanized thermoplastic elastomer according to claim 2, wherein the rubber phase has a gel content of at least 75% by weight.

4. The fully vulcanized thermoplastic elastomer according to claim 1, wherein the plastic matrix of said fully vulcanized thermoplastic elastomer comprises at least one polymer or copolymer thereof selected from the group consisting of polyamide, polypropylene, polyethylene, polyvinyl chloride, polyurethane, polyester, polycarbonate, polyoxymethylene, polystyrene, polyphenylene oxide, polyphenylene sulfide, polyimide and polysulfone.

5. A method comprising preparing a moulded article with the vulcanized thermoplastic elastomer of claim 1.

6. The fully vulcanized thermoplastic elastomer according to claim 1, wherein the average particle size of said rubber phase is 0.05μ-0.2μ.

7. The fully vulcanized thermoplastic elastomer according to claim 1, wherein the weight ratio of the rubber phase to the plastic matrix is 50:50 to 75:25.

8. The fully vulcanized thermoplastic elastomer according to claim 1, wherein said fully vulcanized thermoplastic elastomer is prepared by a process comprising the steps of: (i) providing a fully vulcanized powdery rubber, which is prepared by vulcanizing a corresponding rubber latex with irradiation and (ii) blending the fully vulcanized powdery rubber with a plastic, wherein a weight ratio of the fully vulcanized powdery rubber to the plastic is 30:70 to 75:25.

9. The fully vulcanized thermoplastic elastomer according to claim 1, wherein the average particle size of said rubber phase is 0.05μ~0.5μ.

10. A process for preparing a fully vulcanized thermoplastic elastomer, which comprises the steps of (i) providing a fully vulcanized powdery rubber as a first starting material, and (ii) blending the fully vulcanized powdery rubber with plastic as a second starting material, wherein the fully vulcanized powdery rubber is prepared by vulcanizing a corresponding rubber latex with irradiation, wherein the shape of the fully vulcanized powdery rubber is spheroidic, wherein said fully vulcanized powdery rubber comprises at least one rubber selected from the group consisting of fully vulcanized powdery natural rubber, fully vulcanized powdery styrene-butadiene rubber, fully vulcanized powdery carboxylated styrene-butadiene rubber, fully vulcanized powdery nitrile rubber, fully vulcanized powdery carboxylated nitrile rubber, fully vulcanized powdery polybutadiene rubber, fully vulcanized powdery chloroprene rubber, fully vulcanized powdery silicone rubber, fully vulcanized powdery acrylic rubber, fully vulcanized powdery styrene-butadiene-vinylpyridine rubber, fully vulcanized powdery isoprene rubber, fully vulcanized powdery butyl rubber, fully vulcanized powdery polysulfide rubber, fully vulcanized powdery acrylic-butadiene rubber, fully vulcanized powdery polyurethane rubber, and fully vulcanized powdery fluorine rubber, and wherein the weight ratio of the fully vulcanized powdery rubber to the plastic is 30:70 to 75:25.

11. The process according to claim 10, wherein the weight ratio of fully vulcanized powdery rubber to plastic is 50:50 to 75:25.

12. The process according to claim 10, wherein the average particle size of the fully vulcanized powdery rubber is 0.05μ~0.5μ.

13. The process according to claim 12, wherein the average particle size of the fully vulcanized powdery rubber is 0.05μ-0.2μ.

14. The process according to claim 10, wherein said plastic comprises at least one polymer or copolymer thereof selected from the group consisting of polyamide, polypropylene, polyethylene, polyvinyl chloride, polyurethane, polyester, polycarbonate, polyoxymethylene, polystyrene, polyphenylene oxide, polyphenylene sulfide, polyimide and polysulfone.

15. The process according to claim 10, wherein the first starting material consists essentially of the fully vulcanized powdery rubber and the second starting material consists essentially of the plastic.

16. The process according to claim 10, wherein the average particle size of the fully vulcanized powdery rubber is 0.02μ~1μ.

17. A fully vulcanized thermoplastic elastomer prepared by blending a rubber that is powdery and fully vulcanized with a plastic to form the elastomer with a rubber phase and a plastic matrix, wherein the fully vulcanized powdery rubber that is blended with the plastic is prepared by vulcanizing a latex comprising the rubber with irradiation whereby the rubber phase is formed with particles having a shape that is spheroidic and more regular than if the rubber phase were formed by dynamic vulcanization by means of a cross-linking agent and intense shear stress during blending of the rubber and the plastic, wherein an average particle size of the particles in the rubber phase of said fully vulcanized thermoplastic elastomer is 0.02μ-1μ, and wherein the rubber phase of said fully vulcanized thermoplastic elastomer comprises at least one rubber selected from the group consisting of natural rubber, styrene-butadiene rubber, carboxylated styrene-butadiene rubber, nitrile rubber, carboxylated nitrile rubber, polybutadiene rubber, chloroprene rubber, silicone rubber, acrylic rubber, styrene-butadiene-vinylpyridine rubber, isoprene rubber, butyl rubber, polysulfide rubber, acrylic-butadiene rubber, polyurethane rubber, and fluorine rubber.

* * * * *